A. H. PEYCKE.
TRUCK SPRING DAMPENER.
APPLICATION FILED JULY 30, 1915.
1,169,863.
Patented Feb. 1, 1916.
2 SHEETS—SHEET 1.
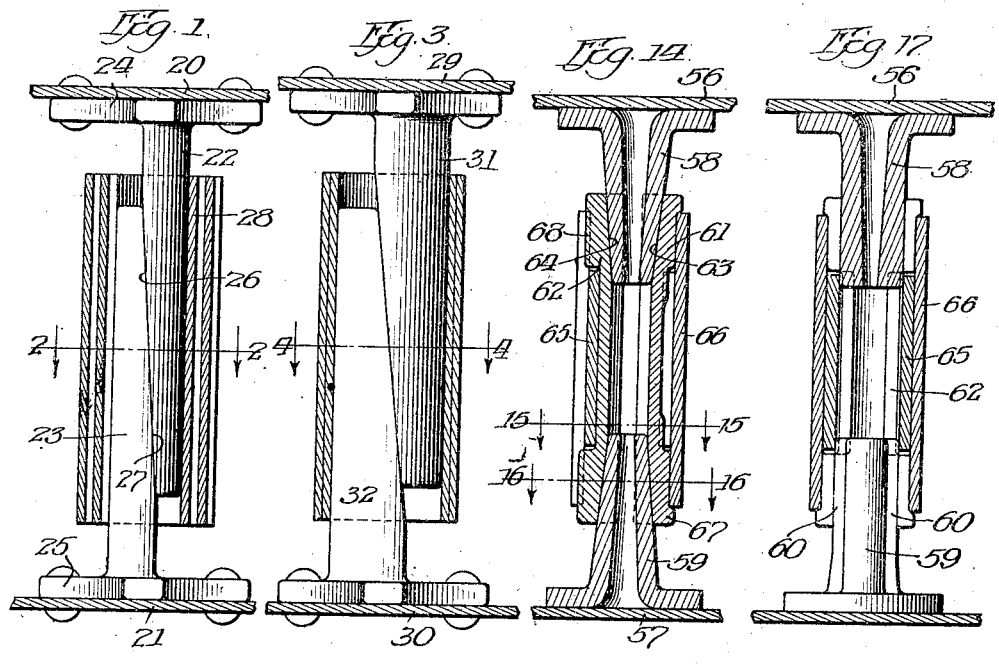
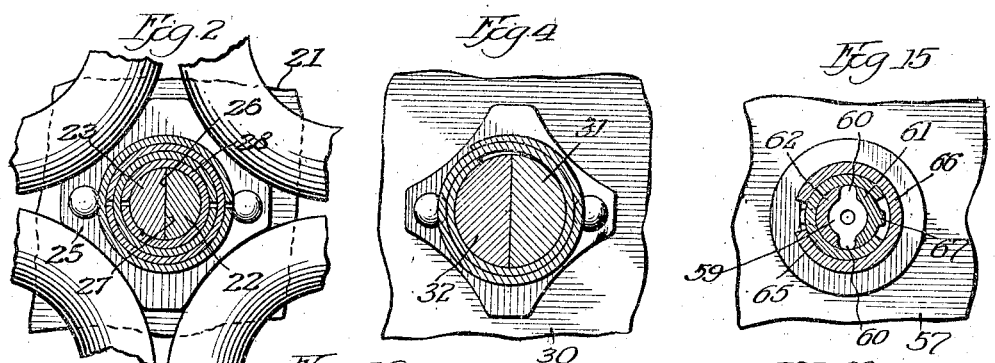
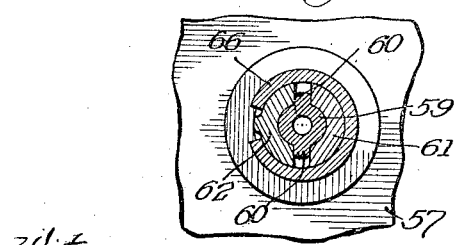
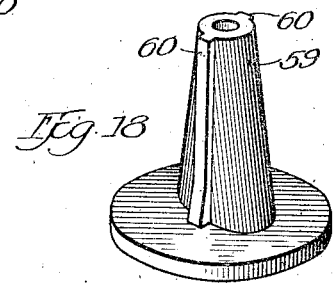

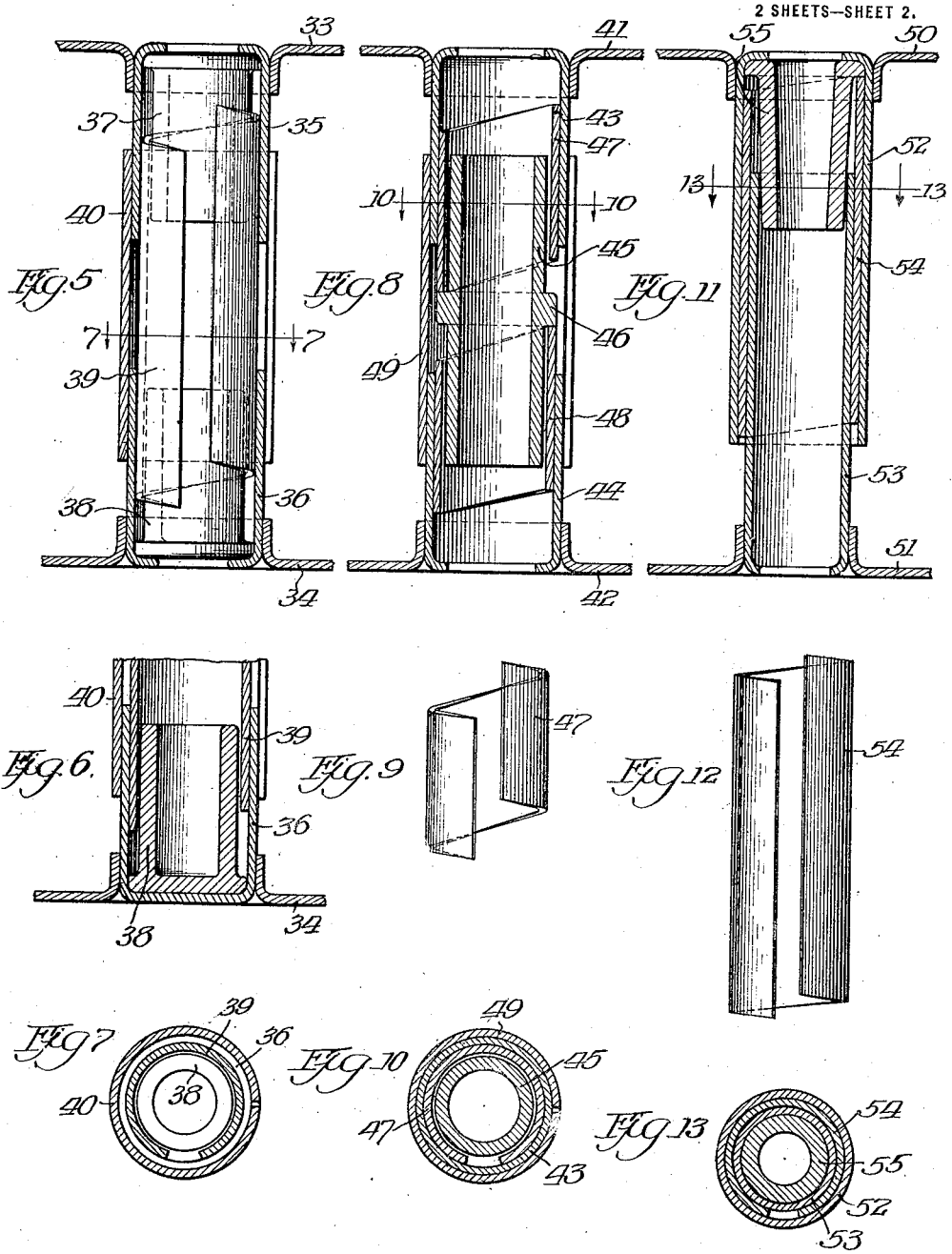

UNITED STATES PATENT OFFICE.

ARMAND H. PEYCKE, OF CHICAGO, ILLINOIS, ASSIGNOR TO AMERICAN STEEL FOUNDRIES, OF NEW YORK, N. Y., A CORPORATION OF NEW JERSEY.

TRUCK-SPRING DAMPENER.

1,169,863.

Specification of Letters Patent. Patented Feb. 1, 1916.

Application filed July 30, 1915. Serial No. 42,693.

*To all whom it may concern:*

Be it known that I, ARMAND H. PEYCKE, a citizen of the United States, and resident of Chicago, in the county of Cook, and State of Illinois, have invented certain new and useful Improvements in Truck-Spring Dampeners, of which the following is a specification.

My invention relates to shock absorbing devices and has particular reference to a novel spring dampener adapted for use in connection with the nest of springs commonly employed in car trucks.

A series of extensive tests have developed the fact that the action of the springs which serve to resiliently support the bodies of railway cars is peculiar. For instance, it was found that an inequality of the track or roadbed caused an initial actuation of the springs carried by the car truck and that under certain conditions the deflections were cumulative; that is, the car body had a tendency to teeter, the up and down movement under the action of the springs increasing progressively until the point was reached at which the springs were completely compressed with the vibration of the car body stopped thereby. Very shortly thereafter the same action was found to be repeated. This action, of course, is deleterious, not only to the springs but to the roadbed and the car. The ordinary vibrations of the car would not be serious but the shock of the full compression of the springs is transmitted throughout the structure of the car and to the roadbed. This is sought to be overcome by the use of greater capacity springs with the result that the required resiliency under light shocks is not present. It has been found therefore that the vibration or teetering of the car may be eliminated without material loss in the resiliency of the springs by the provision of a dampener or friction element in connection with each nest of springs.

My invention therefore has for its object the provision of novel means adapted for association with a nest of springs whereby the cumulative vibration of the car is eliminated and is intended as an improvement on the construction claimed in my copending application Serial No. 42,692, filed of even date herewith.

The invention will be more readily understood by reference to the accompanying drawings, wherein—

Figure 1 is a vertical section through a construction embodying my invention; Fig. 2 is a section on the line 2—2 of Fig. 1; Fig. 3 is a vertical section through a slight modification of the construction shown in Fig. 1; Fig. 4 is a section on the line 4—4 of Fig. 3; Fig. 5 is a vertical section through a further modification; Fig. 6 is a further detail of the lower end of the construction shown in Fig. 5; Fig. 7 is a section on the line 7—7 of Fig. 5; Fig. 8 is a vertical section through a further modification; Fig. 9 is a perspective view of one of the springs shown in Fig. 8; Fig. 10 is a section on the line 10—10 of Fig. 8; Fig. 11 is a vertical section through a further modification; Fig. 12 is a perspective view of the spring shown in that figure; Fig. 13 is a section on the line 13—13 of Fig. 11; Fig. 14 is a vertical section through a further modification; Fig. 15 is a section on the line 15—15 of Fig. 14; Fig. 16 is a section on the line 16—16 of Fig. 14; Fig. 17 is a vertical section taken at right angles to that of Fig. 14; and Fig. 18 is a perspective view of the wedge block shown in Figs. 14 and 17.

Referring more particularly to Figs. 1 and 2 of the drawings, it will be seen that I provide upper and lower spring-retaining plates or caps 20—21 to each of which are secured projections 22, 23, the projections in the present instance being in the form of rods having flanged ends 24, 25, which are riveted to the plates 20, 21. The rods 22, 23 are of reduced section at points near their ends forming wedge surfaces 26, 27. These surfaces are in contact throughout practically their extent. As a means for developing frictional resistance on the downward movement of the plates I surround the wedge members 22, 23 with a plurality of concentric split tubes 28. These tubes are formed of spring metal and when formed the meeting edges are substantially in contact. When the tube is expanded a compressive strain is exerted on the expanding member. As shown in Fig. 2, the joint in each of the tubes is located diametrically opposite the joint in an adjacent tube. The result secured in following the construction described is that of large frictional resistance to the expansion of the combined tubular members. As the wedge members are forced toward each other it will be seen that the friction elements or tubes must expand and as friction is developed throughout the superficial area of the series of tubes the total amount of friction will be found to be large.

In the construction shown in Figs. 3 and 4 the upper and lower plates 29—30 and the wedge members 31—32 are the same as heretofore described. The friction developing element, however, may be in the form of a single plate which is formed in two complete turns. In view of the tendency of the tube thus formed to contact due to the initial set of the metal, expansion of the tube by the movement of the wedge members will be resisted by the friction developed on the surfaces of the tube.

In the construction shown in Figs. 5, 6 and 7, I have provided upper and lower plates 33—34 each thereof having a tube 35—36 rigidly connected to the axis of the plate and the tubes being arranged to project toward each other. Located inwardly in each of the tubes is a thimble 37, 38, and surrounding the thimbles is a helical coil 39 of flat metal, the edges of the plate or coil being separated. When the coil is placed within the tubular extensions 35, 36 it is placed under a slight initial compression whereby the tendency thereof is to expand, a frictional resistance against the walls of the tubular portions being thereby caused. As an additional friction producer I provide the tubular band 40 which surrounds the tubular portions and has the tendency to contract thereon. It will be seen that as the plates and their attached tubes move toward each other that the helical plate will have a tendency to be expanded, thus developing greater frictional resistance on the walls of the tubular extensions.

Referring to the construction shown in Figs. 8 to 10, it will be seen that this is very similar to that just described in that I provide upper and lower plates 41—42 having duplicate tubular extensions 43—44 and within which is mounted a tube 45 having an annular flange 46 intermediate of its ends. Also mounted within the tubes 43, 44 are helical plates 47, 48 similar to that shown in Fig. 5. One end of each of the helical plates contacts the flange 46 on the tube 45 while the exterior surfaces of the helical members engage the walls of the tubular extensions. Also surrounding the tubular portions is a split tube 49. The downward movement of the plate 41 will be frictionally resisted by the split tube 49 and the helical plates 47, 48, these elements acting in opposite directions on the tubes 43, 44.

In the construction shown in Figs. 11 to 13 inclusive, the upper and lower plates 50, 51 and the tubular extensions 52, 53 remain the same. The tubes, however, are slightly longer than those just described and the lower tube 53 telescopes within the upper tube. Interposed between the two tubes at their intersection is the helical plate 54. Mounted in the upper portion of the tube 52 is a thimble 55 against which the upper portion of the helical member 54 abuts. The elements producing friction remain much the same as those heretofore described.

In the construction shown in Figs. 14 to 16 the upper and lower plates 56, 57 are provided with trunco-conical projections 58, 59. To the exterior of these projections are applied guiding ribs 60, as best shown in Fig. 16. Surrounding the projections are counter-part castings 61, 62, the ends of which are inclined to form wedge surfaces 63, 64. The movement of the plates toward each other causes the separation of the castings 61, 62 due to the wedging action of the co-acting elements. This movement is resisted by the split tube 65 and the surrounding oppositely disposed split tube 66. As a means for assuring the proper retention and disposition of the split tubes I provide the end flanges 67 on the castings and, as best shown in Fig. 14, the vertical flanges 68, which latter flanges occupy the space between meeting edges of the split tube 66. A similar construction is provided in connection with the inner split tube 65.

The modifications shown are only typical of others which might be devised and I do not therefore wish to be limited to the forms shown and described.

I claim:

1. In a device of the class described, the combination of a plurality of springs, upper and lower plates serving to retain said springs in operative relation, a non-contractible projection from each of said plates, and a split tube engaging said projections and acting to develop friction on the surfaces thereof independently of said springs whereby the action of such springs is dampened, substantially as described.

2. In a device of the class described, the combination of springs, spring caps, and a tubular non-contractible projection on each of said spring caps, a plurality of spring metal split tubes engaging each of said projections and tending to compress said projections whereby frictional resistance is developed upon relative movement of the tube and caps, substantially as described.

3. In a device of the class described, the combination of a nest of springs, spring caps at the ends of the springs, projections from said caps, said projections being located at substantially the center of the nest of springs, the projections on the caps being in alinement, and a plurality of spring metal split tubes acting upon both of said projections and tending to develop frictional resistance to the relative movement of said caps, substantially as described.

4. In a device of the class described, the combination of a plurality of springs, spring caps at the ends of the springs, a rigid incompressible wedge-shaped projection from each cap, said projections being located substantially in the center of the nest of springs, and a plurality of spring metal bands encircling portions of said wedge-shaped projection, substantially as described.

ARMAND H. PEYCKE.

Witnesses:
C. F. MURRAY,
T. D. BUTLER.